May 1, 1928.　　　　　　　　　　　　　　　1,667,809
F. A. KERSHAW
INTERNAL GAUGE
Filed Dec. 12, 1923
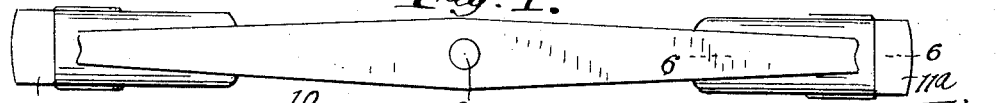
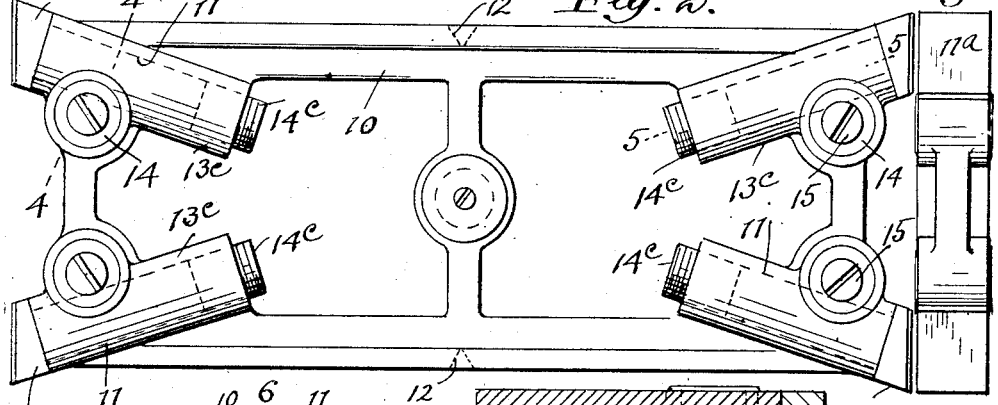
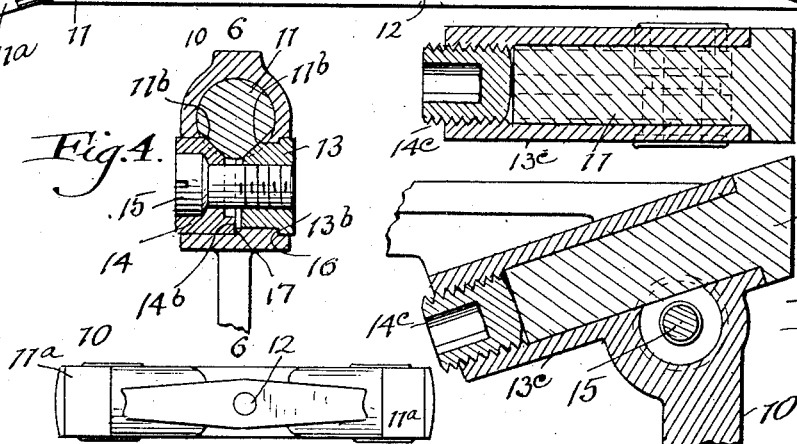
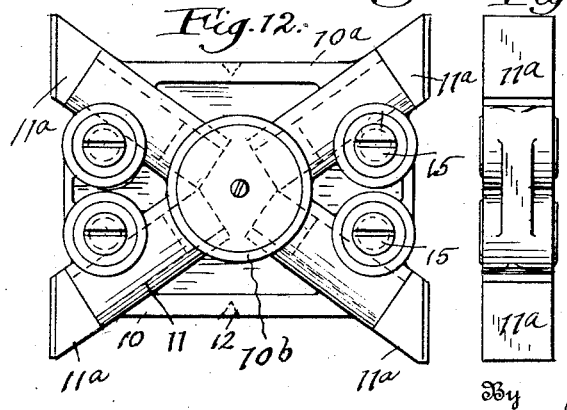

Patented May 1, 1928.

1,667,809

UNITED STATES PATENT OFFICE.

FRANCIS A. KERSHAW, OF KENT, OHIO.

INTERNAL GAUGE.

Application filed December 12, 1923. Serial No. 680,084.

This invention relates to an adjustable internal gauge, and particularly to an adjustable limit gauge for gauging a bore or opening, the same being useful for machinists and others required to do accurate work.

The principal object of the present invention is to provide a gauge of this kind, which can be readily and accurately adjusted to any size within its range and easily restored to size when worn from continued use.

A second object of the invention is to provide a gauge which can be utilized for gauging a very shallow bore or opening as well as one of considerable depth.

Still further the invention aims to provide a gauge having a construction such that it not only has the advantages above mentioned, but is adaptable for gauges of varying sizes, i. e. suitable for a set containing small as well as large gauges. Other more specific objects will appear from the following detailed description of the invention which may be here briefly described as consisting in certain novel details of construction, and combinations and arrangements of parts which will be described in the specification and set forth in the appended claims.

In the accompanying sheet of drawings wherein I have illustrated the preferred embodiment of the invention, Fig. 1 is an edge or side view of my improved gauge; Fig. 2 is a face or plan view of the same; Fig. 3 is an end view; Fig. 4 is a detail transverse sectional view substantially along the line 4—4 of Fig. 2; Fig. 5 is a detail sectional view substantially along the line 5—5 of Fig. 2; Fig. 6 is a detail sectional view substantially along the line 6—6 of Fig. 1; Figs. 7 and 8 are detached views of a pair of clamping pads used for clamping and holding each gauge post; Figs. 9 and 10 are end views of the same looking at the bottom sides of Figs. 7 and 8; Fig. 11 is a side edge view; Fig. 12 is a face or plan view; and Fig. 13 is an end edge view of a relatively small gauge constructed in accordance with and embodying my invention.

The gauge includes a body 10 of substantially rectangular form. It may be more or less solid or of skeleton form such as shown in Fig. 2. At the corners of the body or frame are four adjustable gauge posts 11 having at their outer ends enlargements $11^a$ which may be termed gauge heads.

The two gauge heads at the corners of the same side of the frame constitute the pair utilized for gauging the opening. In using the device as a limit gauge the heads of one pair of posts may be adjusted to a diameter equal to the desired size of the opening or bore plus the oversize tolerance, and the other pair may be adjusted to the desired size of the opening less the undersize tolerance. This tolerance might, for example, be one-one-thousandth of an inch oversize, and one-one-thousandth of an inch undersize, or any other small amount, depending upon the accuracy desired. The frame is provided on its minor axis with a pair of center holes 12 on which the frame is rotated when grinding the outer surfaces of the gauge post heads.

It is to be noted that the gauge posts are diagonally disposed, and in this instance the axes of the posts are radial. The diagonal disposition of the gauge posts is of importance as this admits of the construction being used for small gauges where lack of space would not permit the two posts to be arranged in line with each other. For example, in Fig. 12 I have shown a relatively small gauge, the frame of the same being here designated $10^a$, and by observing this figure, the advantage just stated is apparent.

It is also a feature of this construction that the gauge heads of one pair of posts project beyond the corresponding side of the frame, and that the heads of the other pair project beyond the other side of the frame. This makes it possible to gauge shallow openings as well as deep ones, for it will be observed that it is possible to insert only the tip ends of the gauge posts into the opening to be gauged, and this can be done without any interference by the frame 10. A further advantage of the diagonal arrangement of the posts is that it facilitates the extending of portions of the gauge heads laterally beyond the sides of the frame.

The shanks of the gauge posts are received in diagonally disposed tubular sockets or bosses $13^c$ at the corners of the frame, and the posts are adjusted by screws $14^c$ which are in line with and bear against the inner ends of the posts as shown.

Thus it will be seen that the gauge posts are adjusted from their inner ends, and that the screws are manipulated from the interior of the gauge frame. In the larger size gauges the adjustment of the posts can be attained by applying a suitable tool in the open frame-work. In the smaller size gauges, such as illustrated in Fig. 12, the inner ends of the screws are adjustable from a central opening 10ᵇ (see Fig. 12).

Each post is provided in this instance with two flat faces 11ᵇ, and each post is held from turning and held against accidental displacement axially by two clamping pads in the form of bushings 13 and 14 seated into sockets on opposite sides of the frame and adapted to be drawn tightly against the flat faces 11ᵇ of the posts by a transverse tightening screw 15, the said sockets receiving the bushings being the ends of an opening extending through the frame at right angles to the socket receiving the post.

I regard the details of the clamping pads as an important part of the invention, for the construction is such that the features of accuracy of alignment, permanency and dependability are attained to a maximum degree. Both these clamping pads or bushings have flat faces 13ᵃ and 14ᵃ, which are adapted to engage the flat faces 11ᵇ of the corresponding post. The bushing or pad 13 is preferably tightly fitted into the socket or opening of the frame which is adapted to receive it, and it is preferably provided at its outer end with a flange forming a shoulder 13ᵇ adapted to engage a corresponding shoulder 16 of the frame, as clearly illustrated in Fig. 4. The interior bore or opening of this pad is threaded to receive the screw 15, while the other pad 14 is recessed to receive the head of the screw.

The pad 14 is provided diametrically opposite from the flat face 14 with a shoulder 14ᵇ, and this shoulder is adapted to engage a corresponding shoulder 17 about midway of the transverse opening of the frame which receives the two pads, as clearly shown in Fig. 4. Obviously, therefore, when the screw 15 is tightened, the shoulder 17 acts as a fulcrum, the pad 14 rocking very slightly on this fulcrum under the action of the head of the screw, and serving to pull the flat face 14ᵃ tightly against the corresponding flat face of the gauge post and to cause its other flat face to be tightly clamped against the flat face 13ᵃ of the other pad 13. If desired, the inner end of the head of the screw may be slightly rounded to permit this aligning of the clamping pad 14 to bring the parts into the tightest possible clamping engagement.

The adjustment of the gauges is for the purpose of either compensating for wear, or it can be used for adjusting the distance between the outer ends of each pair of gauge posts to enable the gauge to be used for gauging openings of varying sizes. The amount of adjustment will depend upon the size of the gauge. A gauge of relatively large size will ordinarily be capable of a greater adjustment than a gauge of smaller size. For example, a 12-inch gauge might be adjusted from 12 to 13 inches, or a 11-inch gauge from 11 to 12 inches. A smaller gauge, say a 3-inch gauge might be adjusted from 3 to 3¼ inches, and other size gauges would have corresponding ranges of adjustment.

When an adjustment is to be made, the screws 15 are backed out or loosened so as to release the post of the severe pressure normally exerted by the clamping pads. Then the adjusting screws 14ᶜ are turned until the posts occupy exactly the positions desired, and then the screws 15 are again tightened to hold the posts permanently in their adjusted positions until further adjustment is desired.

It was previously stated that it is an important feature of the invention that the posts be diagonally disposed with reference to the sides of the frame instead of in alignment with each other, and it was pointed out that, as illustrated, the posts are arranged on radial lines. I wish to make clear, however, that the posts may be arranged diagonally without being on raidal lines, and I therefore do not desire to be confined to the precise arrangements shown.

It might be mentioned in conclusion, that the particular post clamping means illustrated is of importance not only because of the efficiency of the clamping action, and therefore because the posts can be held without liability of accidental movement, but the particular clamping construction illustrated permits the quick release for adjustment purposes, and furthermore, since the clamping pad 13 is tightly fitted into the opening of the frame which is shaped to receive it, and since this pad is not loosened when the screw is loosened, its flat face serves as a guide when the post is being adjusted, and then its flat face as well as the flat face of the other pad serve as clamping agencies. The particular clamping means illustrated and described is the most efficient and the one to be preferred in gauges of the highest quality, but the construction of this particular part of the invention may be modified without departing from the other features of the invention.

Having described my invention, I claim:

1. A gauge composed of a substantially rectangular frame with gauge posts located at the corners of the frame, and provided with gauging portions projecting beyond the sides of the frame, said posts being arranged with their axes converging inwardly.

2. A gauge composed of a substantially rectangular frame, provided at the corners with gauge posts having outer gauging portions projecting beyond the sides and ends of the frame, said posts being arranged with their axes converging inwardly.

3. A gauge comprising a substantially rectangular frame having longitudinally adjustable gauge posts disposed diagonally with reference to each other, and means engaging the inner ends of the posts to adjust them.

4. A gauge comprising a substantially rectangular frame having two pairs of gauge posts arranged at the corners of the frame, said posts having gauge portions at their outer ends, one pair of gauge posts along one side of the frame being adapted for use in gauging an opening, said posts extending diagonally inward with reference to the frame.

5. A gauge comprising a substantially rectangular frame having two pairs of gauge posts arranged at the corners of the frame, said posts having gauge portions at their outer ends, one pair of gauge posts along one side of the frame being adapted for use in gauging an opening, said posts extending diagonally inward with reference to the frame, and means for adjusting the posts from their inner ends.

6. An internal gauge comprising a frame or body having a socket, an adjustable gauge post in the socket movable lengthwise thereof, and clamping means for the post comprising two clamping pads engaging the post and a screw for drawing them together against the post, said pads being seated in opposite ends of an opening extending through the frame at right angles to the socket receiving the post, and one of said pads being tightly fitted in the opening and the other movable therein as the screw is tightened or loosened.

7. An internal gauge comprising a frame or body having a pair of gauge posts, at least one of which is adjustable, said frame having a socket receiving said post, and the latter having two clamping faces, and means for clamping and releasing the post comprising a fixed clamping pad engaging one of said faces of the post and serving as a guide when the post is adjusted, a second pad engaging the other face of the post, and a screw for causing the two pads to tightly engage the said faces of the post.

8. An internal gauge comprising a frame having a plurality of gauge posts, at least one of which is adjustable, a socket receiving said post, and the latter having two flat clamping faces, an opening extending through the frame at right angles to the socket, two clamping pads, one seated fixedly in one end of the opening and the other relatively loosely in the other end of the opening, both pads having flat faces adapted to tightly engage the flat faces of the post, the second mentioned pad having a shoulder opposite the flat face and engaging a seat in the opening, and a screw extending through the pads and having threaded engagement with one of the pads.

In testimony whereof, I hereunto affix my signature.

FRANCIS A. KERSHAW.